United States Patent [19]

Crass et al.

[11] 4,367,511

[45] Jan. 4, 1983

[54] ROUGH ELECTRICAL INSULATING FILM OF POLYPROPYLENE AND PROCESS FOR THE MANUFACTURE THEREOF

[75] Inventors: Günther Crass, Taunusstein; Hartmut Hensel, Wiesbaden, both of Fed. Rep. of Germany

[73] Assignee: Hoechst Aktiengesellschaft, Frankfurt am Main, Fed. Rep. of Germany

[21] Appl. No.: 196,028

[22] Filed: Oct. 10, 1980

[30] Foreign Application Priority Data

Oct. 19, 1979 [DE] Fed. Rep. of Germany ....... 2942298

[51] Int. Cl.³ ............................................. H01G 4/18
[52] U.S. Cl. ............................. 361/313; 264/176 R; 264/210.1; 264/210.5; 264/210.7; 361/314; 361/323; 427/79; 428/141; 428/156; 428/163; 428/164; 428/167; 428/409; 428/461
[58] Field of Search .............. 428/141, 409, 156, 163, 428/164, 167, 461, 516, 523, 220, 212; 361/314, 323, 313; 264/176 R, 210.1, 210.5, 210.7; 427/79, 80, 81

[56] References Cited

U.S. PATENT DOCUMENTS

| | | | |
|---|---|---|---|
| 3,223,764 | 12/1965 | Kahn et al. | 264/178 R |
| 3,585,467 | 6/1971 | Linzey et al. | 361/323 |
| 3,614,561 | 10/1971 | Behn et al. | 361/323 |
| 3,746,953 | 7/1973 | Tapp et al. | 361/323 |
| 3,754,311 | 8/1973 | Rayburn | 361/323 |
| 3,772,578 | 11/1973 | George et al. | 361/323 |
| 3,818,288 | 6/1974 | Wenzel | 361/323 |
| 3,857,073 | 12/1974 | Yagitani | 361/323 |
| 3,900,775 | 8/1975 | Takushima et al. | 361/323 |
| 3,967,025 | 6/1976 | Tanabe et al. | 428/480 |
| 3,970,904 | 7/1976 | Suzuki | 428/155 |
| 4,138,520 | 2/1979 | Sato et al. | 428/141 |
| 4,185,148 | 1/1980 | Sato et al. | 526/348.1 |
| 4,228,481 | 10/1980 | DiNicola et al. | 361/314 |
| 4,243,708 | 1/1981 | Eustance et al. | 428/409 |
| 4,287,249 | 9/1981 | Eustance et al. | 428/409 |

FOREIGN PATENT DOCUMENTS

| | | |
|---|---|---|
| 1072288 | 12/1959 | Fed. Rep. of Germany . |
| 1113256 | 8/1961 | Fed. Rep. of Germany . |
| 1275178 | 8/1968 | Fed. Rep. of Germany . |
| 2149888 | 4/1972 | Fed. Rep. of Germany . |

*Primary Examiner*—Stanley S. Silverman
*Attorney, Agent, or Firm*—Schwartz, Jeffery, Schwaab, Mack, Blumenthal & Koch

[57] ABSTRACT

Disclosed is a film for use in the field of electrical insulation comprising a biaxially stretched rough polypropylene film comprising a plurality of first zones of high roughness, the first zones having a relatively high number of α-crystallites; and a plurality of second zones of substantially lesser roughness, the second zones having a substantially lesser number of α-crystallites than the first zones, the first zones being adjacent to the second zones and the adjacent first and second zones forming fine channels between each other. Also disclosed is a method for producing this film.

19 Claims, 5 Drawing Figures

METALLIZED CAPACITOR

FILM-FOIL-CAPACITOR

ROUGH ELECTRICAL INSULATING FILM OF POLYPROPYLENE AND PROCESS FOR THE MANUFACTURE THEREOF

BACKGROUND OF THE INVENTION

The present invention relates to a stretched, rough electrical insulating film of polypropylene, comprising zones having different degrees of roughness which lie side by side and form fine channels between each other. The film is particularly suitable for the fabrication of impregnated capacitors and for the sheathing of cables. The present invention relates also to a process for the manufacture of such film.

The materials presently used in the construction of impregnated capacitors are normally combinations of paper-aluminum, paper-polypropylene film-aluminum, or paper-metallized polypropylene film. The capacitors prepared from such material combinations are, however, relatively voluminous. In view of the constantly decreasing dimensions of electrical components, development tends toward capacitors which are constructed of polypropylene films and aluminum or of metallized polypropylene films only and which are called "all-film capacitors".

As compared with the hitherto used insulating paper, polypropylene films have an excellent insulation resistance and outstanding dielectric properties. Conventional polypropylene films, however, are very smooth and tend to cling to each other. In a capacitor wound from such a film, the air entrapped between the film layers cannot be expelled or can be expelled only incompletely by impregnation. A capacitor of this kind is useless because, even at low voltages, short circuits and punctures will occur in the non-impregnated areas.

In order to improve the impregnatability of capacitors comprising polypropylene films, processes have been developed, wherein these films are roughened by systematically influencing the morphology ($\beta$-$\alpha$ conversion of crystallites). Such processes are described in German Offenlegungsschriften Nos. 2,553,693, 2,601,810 and 2,722,087. Although it has been possible to improve the impregnation of capacitors produced from films manufactured according to these processes, non-impregnated areas cannot be completely eliminated and, as a consequence, the above-described disadvantages experienced with smooth films will still occur. This is due to the fact that these films have completely irregular surface structures over their entire surfaces. During impregnation, the flow paths for the impregnating medium develop purely accidentally, so that non-impregnated areas and thus air pockets cannot be excluded with certainty.

SUMMARY OF THE INVENTION

Accordingly, it is an object of the present invention to provide an improved, rough, biaxially stretched polypropylene film for use in the field of electrical insulation. It is a further object of the invention to provide such a film which, in the wound or folded condition, can be completely and rapidly filled with an impregnating agent, without leaving air pockets between the film layers and which, therefore, does not have the disadvantages of the prior art films.

A still further object of the invention resides in the provision of an improved process for manufacturing such a film product.

Another object of the invention is the provision of an improved capacitor and an improved sheathed cable manufactured with the improved film according to the invention.

In accomplishing the foregoing objects, there has been provided in accordance with the present invention a film for use in the field of electrical insulation, comprising a biaxially stretched, rough polypropylene film, comprising a plurality of zones having different degrees of roughness. The zones of different roughness adjoin each other in a pattern wherein higher-roughness zones are adjacent to lower-roughness zones and the adjacent zones form fine channels between each other. In one embodiment the film further comprises a layer of metal on one surface thereof.

In accordance with another aspect of the invention, there has been provided a process for manufacturing a film of the above-described type, comprising the steps of extruding a pre-film of polypropylene; cooling the extruded pre-film to a temperature which is sufficient to produce $\beta$-crystallites in the pre-film; causing different temperatures in a plurality of first zones and in a plurality of second zones; stretching the pre-film both transversely and longitudinally at a temperature which is sufficient to produce $\alpha$-crystallites in the resulting stretched film; and heat setting the film. In one embodiment, the extruded pre-film is cooled on a take-up roll, and the step of causing different temperatures in first and second zones comprises differently cooling these zones while the pre-film is on the take-up roll. In another embodiment, the step of causing different temperatures in first and second zones comprises differently heating these zones prior to the stretching step.

In accordance with another aspect of the present invention, there has been provided a capacitor, comprising alternating layers of a dielectric material and a metallic conductive material, wherein the dielectric material comprises the film as defined above.

Further objects, features and advantages of the present invention will become apparent from the detailed description of preferred embodiments which follows, when considered in light of the attached drawing.

DETAILED DESCRIPTION OF PREFERRED EMBODIMENTS

Figure 1:
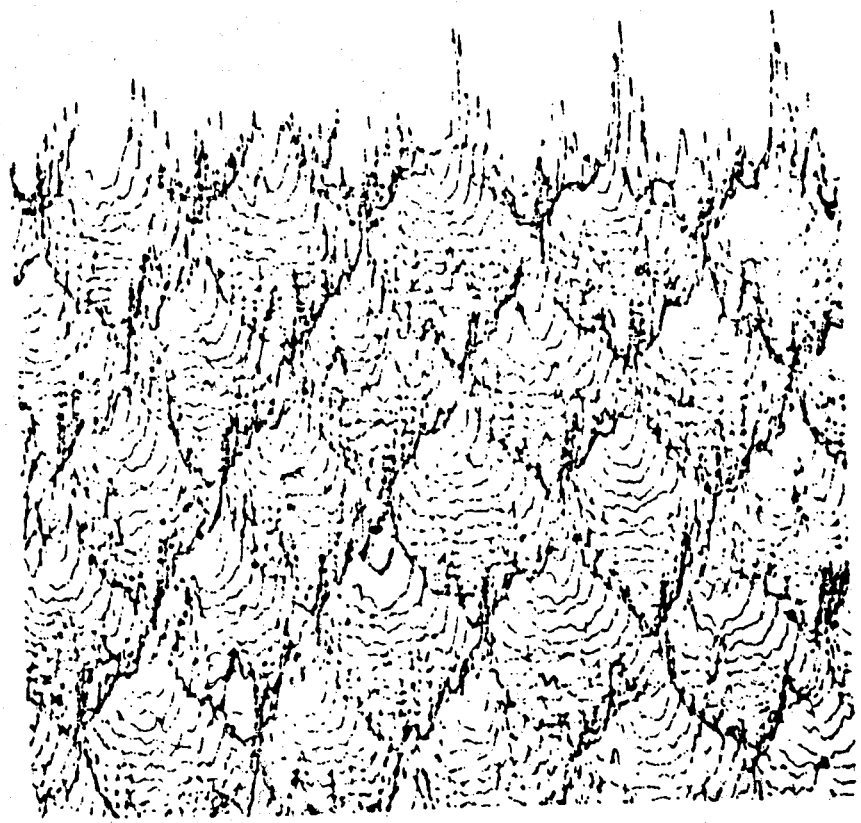
FIG. 1 represents a surface profile roughness measurement of a film according to the invention.

The invention provides a biaxially stretched, rough polypropylene film for use in the field of electrical insulation, which has the characterizing feature that it comprises zones having different degrees of roughness which adjoin each other so that higher-roughness zones are adjacent to lower-roughness zones, and the adjacent zones form fine channels between each other. The fine channels extending between the rougher and less rough zones produce a kind of wick effect when capacitors or cable sheaths are impregnated, and as a result, a complete and rapid impregnation is obtained. The differences in roughness between the zones of higher and lower roughness preferably range between the factors of about 1.5 and 5.0. Although it is also possible to have smaller zones, the different zones preferably have a dimension of about $\geq 0.1$ mm$^2$.

In practice, it has been found that films in which the higher-roughness zones predominate can be impregnated particularly well. The preferred films have mean roughness heights $R_z$ ranging between about 1.0 μm and about 4.0 μm in the higher-roughness zones and between about 0.1 μm and about 1.0 μm in the lower-roughness zones. It is, however, not intended to exclude different roughness values.

Since the films are usually slit after manufacture in the longitudinal direction to give narrow strips which are then, for example, wound into capacitors which are impregnated from their end faces, films are preferred wherein the fine channels run chiefly in the transverse direction with respect to the longitudinal extension of the film web.

Film which are metallized on one surface are especially useful because in that case the capacitor need not be wound or folded from two different webs, i.e., metal and film.

The two surfaces of the films may naturally exhibit different degrees of roughness and roughness ratios, but the roughness height must, on the whole, be low enough to prevent the occurrence of an embossing effect in the first stretching step of the stretching procedure, since this would impair the mechanical strength of the films and is, therfore, to be regarded as a disadvantage.

The invention relates also to a process for the manufacture of the above-defined film, in which the conventional stretching processes for flat films are employed, i.e., transverse-longitudinal stretching, simultaneous stretching or longitudinal-transverse stretching. Depending upon the intended use of the film, re-stretching may be performed in the known manner in the transverse or longitudinal direction or simultaneously, in order to optimize the desired mechanical properties, for example, tensile strength, elongation at break, modulus of elasticity etc.

The process of the invention comprises extruding the poly-propylene through a slot die, cooling it on a take-up roll, stretching the pre-film longitudinally-transversely, or transversely-longitudinally, simultaneously, optionally re-stretching, heat-setting, optionally metallizing and winding up the film. The process is characterized by the features: (1) that the take-up roll is maintained at a temperature which is high enough to produce β-crystallites in the film, (2) that the pre-film is differently cooled in adjacent zones while it is on the take-up roll and/or is differently heated in adjacent zones prior to the first stretching operation, and (3) that the temperature during stretching is adjusted to such a level that the β-crystallites are converted into α-crystallites.

The process may be carried out in such a way that the take-up roll is systematically textured. This may, for example, be done by sandblasting, subsequent chrome-plating and grinding to a defined roughness, or by systematically chrome-plating a partial area of the surface only or by covering partial areas (engraved roll).

By differently cooling the melt on the textured roll, different numbers of β-crystallites are generated in contiguous zones, which lead to different degrees of roughness in the following conversion to α-crystallites. This way of running the process is particularly suitable if the film is subsequently simultaneously stretched in both axis directions.

Alternatively, a correspondingly textured heated roll may also be installed, which procedes the first stretching operation and which, due to its surface texture, causes a different heating up of the pre-film. In the longitudinal-transverse stretching process, preferably the first stretching roll is textured, i.e., designed as an engraved roll. It is, however, also possible to combine the two processes.

The polypropylene is extruded at a temperature of from about 240° to 300° C., preferably from about 250° to 270° C. The first stretching step is carried out at a temperature ranging from about 120° to 160° C., preferably from about 135° to 150° C. The ratio of longitudinal stretching is from about 1:4.0 to 1:6.5, preferably from about 1:4.5 to 1:6.0. The ratio of transverse stretching is from about 1:8.0 to 1:12.0, preferably from about 1:8.5 to 1:10.5.

The biaxially stretched film is heat-set at a temperature ranging from about 150° to 180° C., preferably from about 155° to 165° C.

The film of the invention having a thickness in the range of from about 4 to 30 μm, preferably from about 8 to 20 μm, is particularly suited for employment in the construction of capacitors, and these capacitors can be impregnated considerably more rapidly and with better results than capacitors prepared from film according to the state of the art. Several hundreds of capacitors comprised of the inventive film did not show any failures due to short circuits or punctures.

In addition to its preferred use in the preparation of capacitors, the film of the invention may also be employed for the sheathing of cables, if the cables are impregnated. In the manufacture of the inventive film, it is an obvious prerequisite to use a raw material which is optimal for electrical applications, i.e., which has a very low residual ash content, does not contain any organic or inorganic lubricants and is free from ionogenic constituents.

In the drawings, FIG. 1 represents a typical roughness measurement made on the film of the invention. It clearly shows the contiguous zones of different degrees of roughness and also the fine channels extending between these zones.

Figure 2:
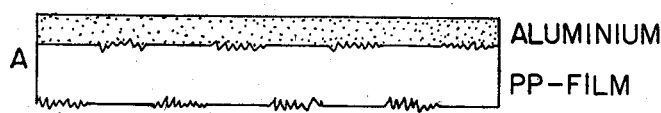
FIG. 2 shows two polypropylene films A which are metallized on one side.
Figure 2:
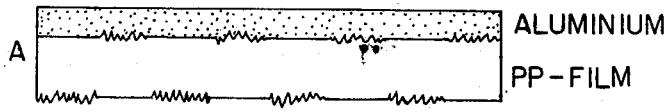
Figure 3:
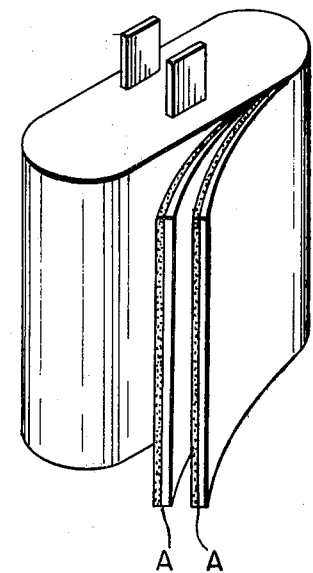
FIG. 3 depicts a capacitor manufactured with the films of FIG. 2.

FIG. 2 shows two films A according to the invention, which are metallized on one surface and used for the manufacture of the capacitor depicted in FIG. 3.

Figure 4:
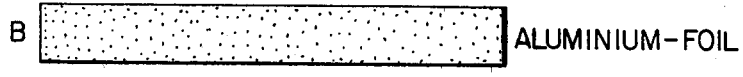
FIG. 4 shows two polypropylene films C and two aluminum foils B.
Figure 4:
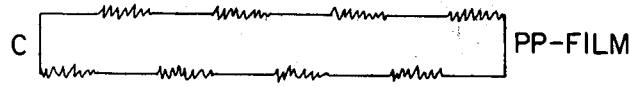
Figure 4:
Figure 4:
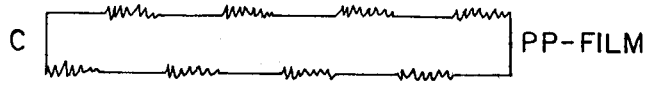
Figure 5:
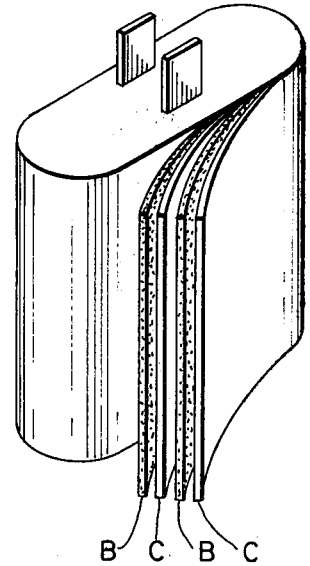
FIG. 5 represents a capacitor manufactured with layers B and C.

The capacitor represented in FIG. 5, on the other hand, is wound from alternating layers of the inventive film C and aluminum foil B which are shown in FIG. 4.

What is claimed is:

1. A film for use in the field of electrical insulation comprising a biaxially stretched rough polypropylene film comprising a plurality of first zones of high roughness, said first zones having a relatively high number of α-crystallites; and a plurality of second zones of substantially lesser roughness, said second zones having a substantially lesser number of α-crystallites than said first zones, said first zones being adjacent to said second zones and said adjacent first and second zones forming fine channels between each other.

2. A film according to claim 1, produced by the process comprising the steps of:
extruding a pre-film of polypropylene;

cooling the extruded pre-film to a temperature which is sufficient to produce β-crystallites in the pre-film;

generating a substantially higher number of β-crystallites in said first zone in comparison to said second zone by causing different temperatures in said first and said second zones;

converting said β-crystallites to α-crystallites by stretching the pre-film both transversely and longitudinally at a temperature sufficient to produce α-crystallites in the resulting stretched film whereby said first zones having a relatively high number of α-crystallites and said second zones have a substantially lesser number of α-crystallites are produced; and heat setting the film.

3. The film according to claim 2, wherein said extruded pre-film is cooled on a take-up roll, and said step of causing different temperatures in first and second zones comprises differently cooling said first and second zones while the pre-film is on said take-up roll.

4. The film according to claim 2, wherein said step of causing different temperatures in said first and second zones comprises heating said first and second zones prior to said stretching step.

5. The film according to claim 2, wherein said stretching step comprises first longitudinally stretching said pre-film followed by transversely stretching said pre-film.

6. The film according to claim 2, wherein said stretching step comprises first transversely stretching said pre-film followed by longitudinally stretching said pre-film.

7. The film according to claim 2, further comprising the step of metallizing one side of said film.

8. The film according to claim 2, further comprising the step of re-stretching said film prior to heat setting.

9. The film according to claim 5, wherein said stretching step is carried out between about 120° C. and 160° C., the ratio of longitudinal stretching is from about 1:4 to 1:6.5, the ratio of transverse stretching is from about 1:8 to 1:12 and wherein the biaxially stretched film is then heat set at a temperature of from about 150° C. to 180° C.

10. The film according to claim 1, wherein both sides of said film comprise a plurality of first zones of high roughness, said first zones have a relatively high number of α-crystallites; and a plurality of second zones of substantially less roughness, said second zones having a substantially lesser number of α-crystallites than said first zones, said first zones being adjacent to said second zones and said adjacent first and second zones forming fine channels between each other.

11. The film according to claim 9, wherein said stretching step is carried out between about 135° C. and 150° C.

12. The film according to claim 1, wherein said first and second zones are regularly distributed, over the surface of the film.

13. A film according to claim 1, wherein the degree of roughness of the higher-roughness zones and the lower-roughness zones differ by a factor of about 1.5 to 5.0.

14. A film according to claim 1, wherein the size of said zones is $\geq 0.1$ mm$^2$.

15. A film according to claim 1, wherein the higher-roughness zones predominate as against the lower-roughness zones.

16. A film according to claim 1, wherein the mean roughness height $R_z$ ranges between 1.0 μm and 4.0 μm in the higher-roughness zones and between 0.1 μm and 1.0 μm in the lower-roughness zones.

17. A film according to claim 1, wherein said fine channels run in the transverse direction with respect to the longitudinal axis of the film.

18. A film according to claim 1, further comprising a layer of metal on one surface.

19. A capacitor, comprising alternating layers of a dielectric material and a metallic conductive material, wherein the dielectric material comprises the film as defined by claim 1.

* * * * *

UNITED STATES PATENT AND TRADEMARK OFFICE
CERTIFICATE OF CORRECTION

PATENT NO. : 4,367,511
DATED : January 4, 1983
INVENTOR(S) : Gunther Crass and Hartmut Hensel It is certified that error appears in the above—identified patent and that said Letters Patent is hereby corrected as shown below:

Column 4, line 6, kindly delete "procedes" and insert therefor --precedes--.

Signed and Sealed this

Fifth Day of July 1983

[SEAL]

Attest:

Attesting Officer

GERALD J. MOSSINGHOFF
Commissioner of Patents and Trademarks